United States Patent Office  3,496,931
Patented Feb. 24, 1970

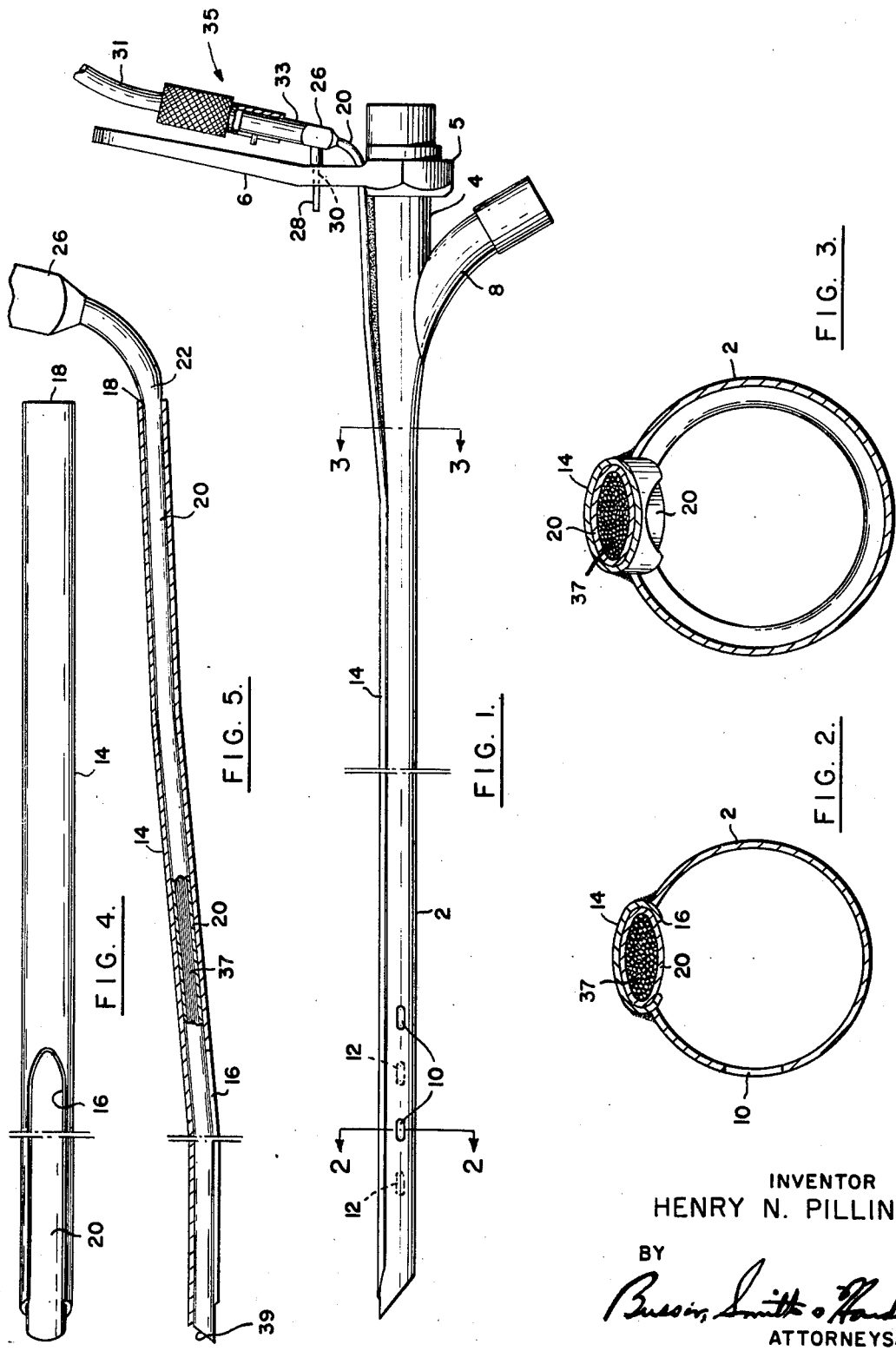

3,496,931
ILLUMINATING ENDOSCOPE WITH OVAL FIBER OPTIC CHANNEL
Henry N. Pilling, Gladwyne, Pa., assignor to Pilling Co., Fort Washington, Pa., a corporation of Pennsylvania
Filed Sept. 20, 1966, Ser. No. 580,676
Int. Cl. A61b 1/06; G02b 5/14; C03b 37/00
U.S. Cl. 128—6                                     4 Claims

ABSTRACT OF THE DISCLOSURE

An illuminating endoscope is provided with light-conducting fibers contained in a tube having an oval cross-section. The oval tube is contained in an oval channel extending lengthwise along the wall of the endoscope bore, and is removable from the channel. The channel is open throughout the part of its length where the bore diameter is minimum.

This invention relates to endoscopes for viewing internal organs of the body and has particular reference to endoscopes having fiber optic illuminating means.

Several advantages are realized from the use of fiber optic light conductors in conjunction with endoscopes, one important advantage being that greater illumination can be obtained than can be obtained with an electric lamp contained within the endoscope at its distal end since a large external light source can be used, which transmits light to the distal end of the endoscope through a light conductor. Lamps of the type used in endoscopes are necessarily minute, and their illumination capabilities are accordingly limited. With the use of fiber optic light conductors, a great amount of illumination can be obtained without the undesirable heating of the instrument and the illuminated area which occurs in instruments containing incandescent lamps. An additional advantage is that fiber optic light carriers are much less susceptible to breakage than are conventional sources of illumination.

Taking bronchoscopes as typical endoscopes for the sake of example, their external dimensions depend on the age of the patient, a typical diameter being three millimeters in the case of a bronchoscope for use with a newborn infant, while a bronchoscope having a diameter of nine millimeters might be used in the case of an adult. These dimensions being small even in the adult case, it is important that the maximum lumen be provided in order that the surgeon performing the examination may have an unobstructed view through the bore of the device. The provision of a maximum lumen is likewise highly desirable in all surgical examining instruments of this general type, and illuminating means contained in these instruments are often responsible for a significant reduction of the lumen. Electric light bulbs contained in the bore of an endoscope, for example, necessarily result in obstruction of view. The situation is improved by the use of fiber optic light carriers running through the bore of the endoscope, but again, an objectionable obstruction exists.

Heretofore, lesser degrees of obstruction have been achieved by the provision of cylindrical channels carrying the light conducting fibers, these channels being either external to the bore of the endoscope, or by providing channels which are partially external and partially internal to the bore, the latter arrangement being a compromise between the maximum inner lumen, which gives the best visibility, and the most desirable external shape of the endoscope. The channels containing the light conducting fibers in endoscopes have heretofore been in the form of circular cylinders.

In accordance with this invention, a better use is made of the available space in the body cavity of the patient by providing a light conducting channel in the endoscope which is in the form of a cylinder having a cross-section which is oval. That is, the cross-section of the channel has its smaller dimension in the radial direction with respect to the bore of the endoscope and its larger dimension in the direction of the circumference of the endoscope. The term "oval," as used in this specification, therefore, is to be understood as referring to any shape under the above definition.

In endoscopes having fiber optic light conducting means, it is generally preferred that the light conductor be constructed so that it enters the endoscope at the proximal end and so that it is bent at or near a right angle to the axis of the bore of the endoscope so that the external light conductor carrying light from the light source does not interfere with telescopic apparatus attached to the proximal end or with instruments inserted into the bore of the endoscope. Where the light conducting channel is in the form of a metal cylinder having an oval cross-section and containing a fiber bundle, certain difficulties arise in its construction because of the necessity of effecting a bend in the metal cylinder. Oval cylinders have a tendency to form a kink when bent, and since it is necessary or at least easier to insert the fiber bundle before bending, damage to the fibers might occur during the bending operation. It is substantially impossible to introduce a full bundle of fibers into a tube having a kink resulting from bending. A circular section is therefore provided at an end of the tube where the bend is made, and the tendency to kink during bending is thereby substantially reduced and fibers can be inserted in the tube without danger of damage during the subsequent bending operation since the circular portion of the tube is not completely filled with fibers as is the oval portion.

An object of the present invention, therefore, is to provide an endoscope with a fiber optic light conductor, providing improved visibility through its bore, which is very important to an operating surgeon, and having unobjectionable external shape.

Other objects will become apparent from the following description when read in conjunction with the accompanying drawings, in which:

FIGURE 1 is a side elevation of a bronchoscope in accordance with this invention;

FIGURE 2 is a section of the bronchoscope taken on the plane 2—2 of FIGURE 1;

FIGURE 3 is a section of the bronchoscope taken on the plane 3—3 of FIGURE 1;

FIGURE 4 is an elevation of the external channel for the light conductor with the conductor therein, this channel being an element of the bronchoscope shown in FIGURE 1; and FIGURE 5 is a partially cut-away elevation of the inner light conducting tube which forms a part of the bronchoscope shown in FIGURE 1 and includes a section of the outer channel.

It will be understood that, while the invention is described with reference to a bronchoscope, the invention is generally applicable to endoscopes including esophagoscopes, gastroscopes, cystascopes and the like.

Referring to FIGURE 1 a bronchoscope is shown having a tubular body member 2 which is flared at its proximal end 4. The flaring of the proximal end provides increased visibility since it causes the position of the operator's eye to be less critical. The critical dimensions are those of the distal end, since this is the end which passes between the vocal cords of the patient. If the distal end is too large for the particular patient, edema or trauma of the vocal cords can result.

A fitting 5 having a handle 6 is fixed to the proximal end of the bronchoscope, and a transverse passage 8 is provided for the introduction of air or oxygen or anesthetics into the bore of the bronchoscope. Telescopes or other optical devices may be removably attached to fitting 5 in order to magnify the tissues appearing at the distal end of the endoscope.

The tubular body member 2 of the bronchoscope is provided near its distal end with openings 10 to permit breathing. Similar openings 12 appear on the other side of the tubular body. These openings are staggered along the body near the distal end, and are arranged so that all of them cannot be closed off simultaneously by engagement with the wall of the bronchus. These openings may be eliminated in other endoscopes which are not used for examination of the respiratory passages.

In the construction of the bronchoscope, member 2 is originally in the form of a slotted tube, and a channel 14, which appears in each of the figures and which is in the form of a tube having a slot 16 part way along its length, is fixed in a suitable manner, as by soldering, to the body so that it closes the slot in member 2, and so that slot 16 in the channel 14 faces inwardly toward the bore of the body member.

Referring to FIGURES 1, 3 and 4, channel 14 extends along the length of the member 2, and opens to the bore of the body member at the end of slot 16, and has an opening 18 at the proximal end of the instrument for the insertion of the inner light conducting tube 20.

The inner light tube 20 is formed from a metal tube originally having an oval cross-section throughout. A short section of the tube near one end is reshaped in a suitable pressing apparatus so that its cross-section is in the form of a circle rather than an oval. The ratio of the longer dimension of the cross-section of the oval portion of tube 20 to the shorter dimension is preferably about 1.5:1 and should be at least 1.3:1. The end of the oval portion of the channel and the beginning of the circular portion of the channel is indicated at 22.

In shaping tube 20, the oval metal tube is first compressed along part of its length to produce the circular cross-section. A bundle of light conducting fibers is inserted into channel 20 and the tube is bent in its circular portion. The tube will not be pinched at the bend.

This bend in the tube is necessary so that the connection between the light source and the proximal end of the tube does not interfere with vision through the bore of the endoscope, and also so that instruments such as forceps may be inserted through the proximal opening without interference.

A fitting 26 is secured to the circular portion of the tube, and a pin 28 extends therefrom to be inserted through hole 30 provided in handle 6. The pin prevents damage to the tube 20 by twisting under the pull of the flexible light conductor 31 leading from the instrument to the light source. A bayonet connector 33 is provided in fitting 26 for connection to the flexible light-conducting tube 31, which terminates in an assembly 35, which is adaped to receive the bayonet connector 33 in such a manner that the end of the fiber bundle within conductor 31 abuts or terminates adjacent to the end of the fiber bundle extending through fittting 26 and connector 33.

The proximal end of channel 14 terminates at handle 6, and an opening through handle 6 permits insertion of the light channel 20 into channel 14 through opening 18.

Channel 20 has running through its interior a bundle 37 of light-conducting fibers which may be formed, for example, from glass fibers which may be coated with a suitable substance having a relatively low refractive index compared to that of glass to prevent loss of light through the sides of the individual fibers. The bundle of fibers is cemented within channel 20, and the ends of the fiber bundle are sealed with transparent cement. Various light conducting materials other than glass are available and may be used alternatively. Various transparent plastics may be used, for example.

The distal end 39, of the light conducting channel and the end of each fiber in the bundle is beveled so that light leaving each fiber is refracted toward the area viewed through the bore of the endoscope. This produces a more even distribution of light on the viewed surface.

The proximal end of the fiber bundle 37 receives light from the end of the fiber bundle contained in the flexible light conductor 31. The other end of this flexible light conductor is arranged to receive light from a suitable light source which may be considerably removed from the endoscope.

Referring to FIGURE 5, the tube 20 is shown inserted into outer channel 14. Because of the curvature of the outer channel, the inner channel is held in place frictionally, channel 20 being normally straight throughout the portion of its length which is inserted into channel 14, and being bent slightly upon insertion. The outer channel 14 is open to the interior of member 2 throughout part of its length as illustrated in FIGURE 2, and is closed throughout the part of its length adjacent the flared portion of member 2 as illustrated in FIGURE 3. The fact that this channel is open near the distal end of of the bronchoscope, where the bore of member 2 is narrow, permits better visibility through the bore. Metal in addition to that necessary to hold the tube 20 against the wall of the bore is superfluous and its elimination results in greater visibility.

From FIGURE 3, it can be seen that the lumen is only slightly obstructed by the light conducting tube 20 and almost not at all by channel 14, and the outer dimensions are not greatly increased by the inclusion of the light conducting channels. In fact, the shape of the outer surface is almost circular, the outer light conducting channel 14 extending only slightly beyond the circumference of member 2 and comprising only a minor irregularity in its surface. A circular light conductor having the same light conducting capabilities, even though it would have a smaller cross-sectional area, would cause considerably more obstruction of view through the bore since it would extend further toward the center of the bore, and would necessarily increase the external dimensions of a given endoscope so that its usefulness would be further limited.

It will be understood that various cross-sectional shapes of the light conducting tube will give advantageous results, so long as the maximum dimension of the tube in the circumferential direction with respect to the bore of the endoscope compares with its maximum radial dimension with respect to the bore of the endoscope by a ratio greater than 1.3 to 1. The ratio of dimensions of the outer channel 14 conforms with the ratio of dimensions of tube 20, the object being to provide maximum visibility through the bore of the instrument with minimum transverse dimensions.

What is claimed is:

1. An endoscope having a tubular body, a channel having a substantially oval cross-section extending lengthwise along the bore of said tubular body, said channel being adjacent the wall of said bore and extending at least partially outward from the wall of said bore, the smaller dimension of said oval cross-section being in a radial direction from the axis of said bore, and the larger dimension of said oval cross-section being substantially tangential to said bore, said larger dimension being at least 1.3 times said smaller dimension, a removable tube extending through said channel, said tube having a substantially oval cross-section conforming to the cross-section of said channel and occupying all of the space within said channel, means for holding said tube against movement toward the center of said bore, a light-conducting fiber bundle within said tube terminating at one end adjacent the distal end of said bore and means at the opposite end of said fiber bundle for receiving light from a light source.

2. An endoscope according to claim 1, in which said channel is open to said bore throughout the section of said bore where the diameter of said bore is minimum.

3. An endoscope according to claim 1, in which said tubular body is flared toward its proximal end and in which said channel is curved away from the axis of said bore near the proximal end of said tubular body.

4. An endoscope according to claim 1, in which said tube has an oval cross-section throughout a section of its length extending through said channel and has a circular cross-section throughout a section of its length at the exterior of said channel, said tube having a bend in said section of its length at the exterior of said channel.

References Cited

UNITED STATES PATENTS

| | | | |
|---|---|---|---|
| 951,285 | 3/1910 | Meyer | 128—6 |
| 1,286,083 | 11/1918 | Pennington | 128—6 |
| 2,544,914 | 3/1951 | Cameron | 128—6 |
| 3,032,031 | 5/1962 | Moore | 128—6 |
| 3,261,350 | 7/1966 | Wallace | 128—6 |
| 3,269,387 | 8/1966 | Wallace | 128—6 |
| 3,278,283 | 10/1966 | Bazinet | 65—4 |
| 3,297,022 | 1/1967 | Wallace | 128—6 |
| 3,368,552 | 2/1968 | Böttcher | 128—4 |
| 3,383,192 | 5/1968 | Siegmund | 65—4 |

FOREIGN PATENTS

| | | |
|---|---|---|
| 1,483,314 | 4/1967 | France. |
| 811,853 | 8/1951 | Germany. |
| 295,527 | 3/1954 | Switzerland. |

RICHARD A. GAUDET, Primary Examiner

K. L. HOWELL, Assistant Examiner

U.S. Cl. X.R.

65—4; 350—96